W. RACHALS.
AUTOMATIC COUPLING DEVICE.
APPLICATION FILED MAY 24, 1915.
1,155,006.
Patented Sept. 28, 1915.
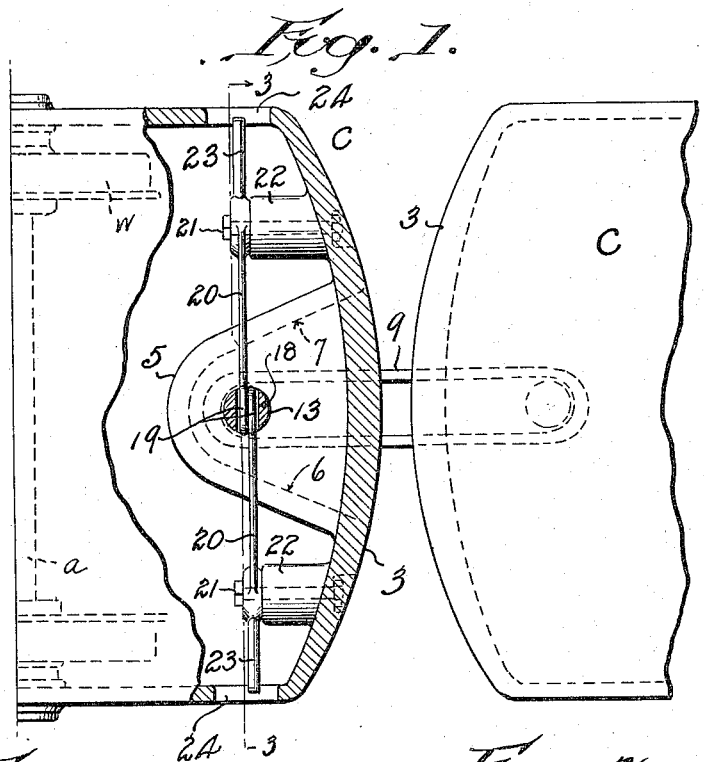
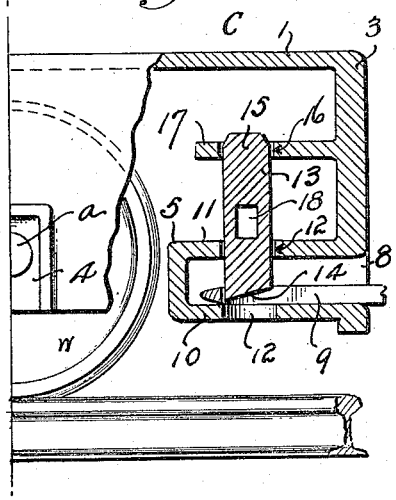
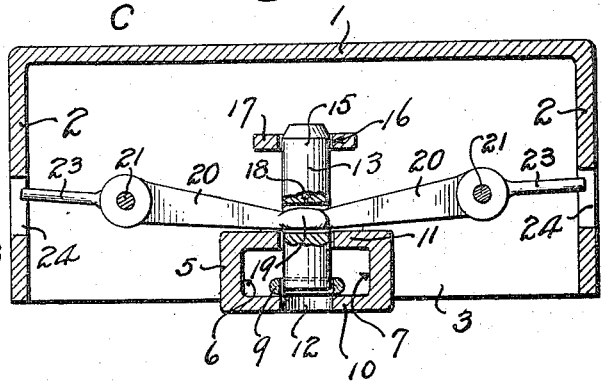
Witnesses
Agnes A. Johnston
Inventor
WALTER RACHALS
By W. C. Carman
Attorney

UNITED STATES PATENT OFFICE.

WALTER RACHALS, OF YOUNGSTOWN, OHIO.

AUTOMATIC COUPLING DEVICE.

1,155,006.  Specification of Letters Patent.  Patented Sept. 28, 1915.

Application filed May 24, 1915. Serial No. 30,183.

*To all whom it may concern:*

Be it known that I, WALTER RACHALS, a citizen of the United States, residing at Youngstown in the county of Mahoning and State of Ohio, have invented certain new and useful Improvements in Automatic Coupling Devices, of which the following is a specification.

This invention relates in general to car coupling devices, and more particularly to a novel automatic coupling especially adapted for use in connection with flat cars generally employed to transport metal in various forms around industrial plants.

To this end, the present invention contemplates a coupling device which is built in the car body in such a manner that all of its operative parts are arranged and concealed within the housing formed thereby, thus presenting no projecting or protruding parts, and permitting of a stronger and more substantial construction than would otherwise be possible. This arrangement has the distinct advantage of locating all of the parts of the coupler permanently associated with the car entirely out of the way, and protects the same from the weather and accidental blows or knocks that might damage the same.

Another object of the invention is to provide a simple and practical construction that is thoroughly reliable, easy and convenient to operate, and which may be economically made and kept in repair.

With the above and other objects in view which will more readily appear as the nature of the invention is better understood, the same consists in the novel construction, combination and arrangement of parts hereinafter more fully described, illustrated and claimed.

By reference to the accompanying drawings it will be noted that Figure 1 is a top plan view of the end portions of two adjacent flat cars, one of which is shown in section to clearly illustrate the novel features of the present coupling device. Fig. 2 is a fragmentary side elevation partly in section of a car embodying the present invention. Fig. 3 is a transverse sectional view on the line 3—3 of Fig. 1.

Similar reference characters designate corresponding parts throughout the several figures of the drawings.

Referring to the embodiment of the invention illustrated in the drawings, it will be noted that the reference C designates the car body in its entirety, and which essentially include a platform 1, the opposite depending side wall members 2, and the rounded end portions or walls 3, thus providing a car body of substantially inverted box-like form, which may readily be made in a single casting. This type of car body, therefore, presents a hollow interior which constitutes a housing for the entire running gear of the car, which primarily includes the usual wheels $w$ and axles $a$ mounted in journal boxes 4 slidably arranged in the usual recesses of the side walls 2.

As indicated, the invention proposes to utilize the hollow interior of the car body to conceal and house the automatic coupling construction forming the subject of the present invention. In this connection, it will be observed that the body 1 may be formed at either one or both of its ends 3 with an inset integral centrally-located draw head 5, whose opposite side walls 6 and 7 diverge outwardly to provide a horizontal flared opening or mouth 8 which permits the necessary lateral movement for the coupling link 9 when the cars are negotiating turns or curves. The upper and lower walls 10 and 11 of the draw head are provided with opposite concentric openings 12, which slidably receive a relatively stout coupling pin 13. This coupling pin 13 is beveled at its lower end as at 14 to facilitate its proper engagement with the coupling link 9 which also has beveled ends, while the upper end 15 of the pin freely slides in the opening 16 of an inset guide flange 17 formed integral with the end wall 3 of the car body, and spaced above the upper wall 11 of the draw head 5. Accordingly, it will be apparent that the coupling pin 13 has a vertical sliding movement in the draw head 5 and guide flange 17, and operates by gravity to automatically permit its beveled end 14 to ride over the beveled end of the coupling link 9 when the latter is inserted in the draw head, so that the latch end of the pin will engage behind the inner portion of the coupling link and thus securely hold the same.

For the purpose of releasing the coupling pin 13 from engagement with the coupling link 9, the same is provided with an intermediate transverse slot 18 which is of sufficient dimensions to accommodate the inner ends 19 of a pair of oppositely arranged lifting levers 20. These lifting levers 20 are mounted on pivot pins 21 journaled in the pivot bosses 22 which project inwardly from the end 3 of the car body. Each of the lifting levers 20 is provided with a hand grip or handle 23 located adjacent openings 24 in the opposite side wall members 2 of the car body, so that when it is desired to effect an uncoupling operation, it is only necessary for an operator to insert his hand or implement within the opening 24 on either side of the car and push down on the handle 23, thus turning the lever 20 on the pivot 21 and lifting the coupling pin 13 clear and free of its engagement with the coupling link 9. Accordingly, it will be apparent that this novel arrangement of levers makes the uncoupling of the device an easy and convenient matter, the operation being permitted from either side of the car, and in case it is impossible to operate the levers by hand, the handle portions 23 thereof are so constructed that an ordinary piece of pipe section may be slipped onto the same to obtain a greater leverage.

In addition to constituting the lifting means for the coupling pin 13, the levers 20 also constitute means for holding the coupling pin in position. That is to say, as the ends 19 of the levers are loosely held within the slot 18 of the coupling pin, they prevent the latter from falling out under ordinary conditions. However, this feature may be of importance in assembling or taking apart the construction for repair purposes, since the levers 20 may be dismounted by removing the pivot pins 21, and then the coupling pin 13 will readily fall out through the openings 12 in the draw head, or conversely may be readily inserted in working position by this same operation.

From the foregoing description, it is thought that the many features and advantages of the present invention will be readily apparent, and that minor changes in the details of construction may be resorted to without departing from the spirit of the invention or scope of the appended claims.

I claim:

1. An automatic coupling device including a flanged car body having a draw head housed inside of the flanged body and projecting inwardly from an end wall thereof, a coupling pin element working in the head, and lever means for operating said coupling pin element from the side of the car body.

2. An automatic coupling device including a flanged car body having a draw head formed in an end thereof and provided with side openings, a coupling pin element associated with said draw head, and means for operating said coupling pin element comprising lever members pivotally carried by and housed within the flanged car body, and having their inner ends engaging with said coupling pin element, and their opposite ends exposed through said openings.

3. An automatic coupling device including a hollow flanged car body having a draw head housed inside of the hollow flanged body and projecting inwardly from one end wall thereof, a coupling pin element working in the head, and oppositely located levers connecting at a common point with the coupling pin, and operable from either side of the car body.

4. An automatic coupling device including a hollow flanged car body having a draw head formed therein, guide means adjacent to said draw head, a coupling link, a vertically slidable pin for automatically engaging said coupling link, and oppositely arranged manually controlled levers engaging with said pin for lifting the same in the draw head and guide.

5. An automatic coupling device including a flanged car body having a draw head housed inside of the flanged body and projecting inwardly from an end wall thereof, guide means also formed from an end wall of the car body adjacent the draw head, a coupling pin vertically slidable in the draw head and guide means, and coupling pin operating means carried by and housed within the car body, and operable from either side thereof.

6. An automatic coupling device including a flanged car body having a draw head formed therein, an integral guide flange spaced from and arranged above said draw head, a coupling link, a coupling pin slidable in said draw head and guide flange, and adapted to engage said coupling link, and manually controlled oppositely arranged lever devices engaging with said coupling pin and operable from either side of the car body.

7. An automatic coupling device including a car body having a draw head formed therein, a guide flange adjacent said draw head, a coupling pin slidable in said draw head and guide flange and having a beveled end and a slot, and releasing levers pivoted to the car body on opposite sides of the coupling pin and engaging within the slot thereof.

8. An automatic coupling device including a car body having side portions provided with openings and end portions formed with a draw head, an integral guide flange spaced above each draw head, a slotted coupling pin vertically slidable in said draw head and guide flange, pivot bosses projecting inwardly from the end of the car body and disposed on opposite sides of the coupling pin, pin lifting levers pivoted on said pivot bosses and having their inner ends arranged in the slot of said coupling pin, said levers also having handle portions exposed through the openings in the side walls of the car body.

In testimony whereof I hereunto affix my signature in the presence of two witnesses.

WALTER RACHALS.

Witnesses:
 FRED WOODFORD,
 W. L. KAUFFMAN.